July 4, 1939. W. A. JOHNSON 2,165,054
APPARATUS FOR COMPARING OR MEASURING THE DIFFUSE
REFLECTION OF LIGHT FROM SURFACES
Filed Feb. 5, 1937
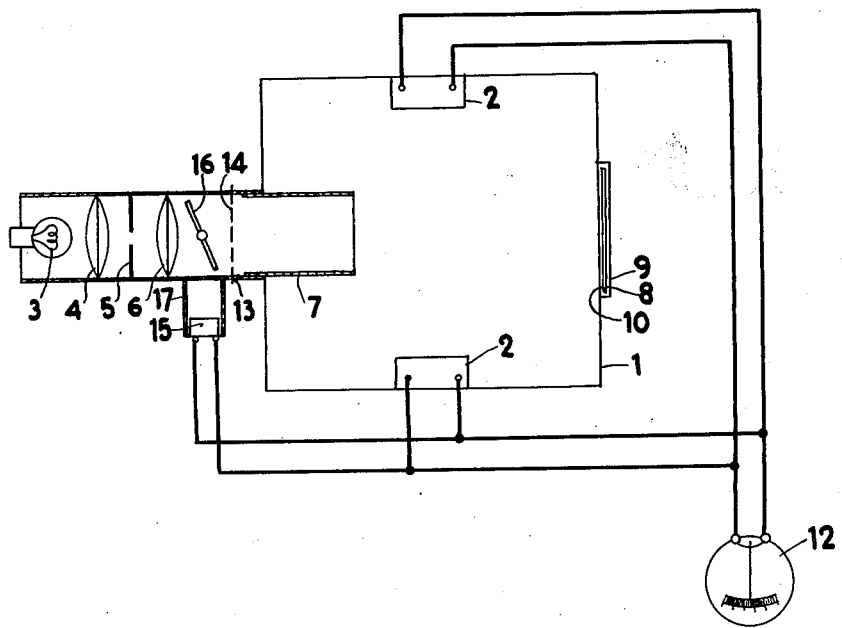
INVENTOR,
William A Johnson
M.H. Lockwood
ATTORNEY.

Patented July 4, 1939

2,165,054

UNITED STATES PATENT OFFICE 2,165,054

APPARATUS FOR COMPARING OR MEASURING THE DIFFUSE REFLECTION OF LIGHT FROM SURFACES

William Arthur Johnson, Birkdale, England, assignor to The General Electric Company Limited, London, England Application February 5, 1937, Serial No. 124,267
In Great Britain January 6, 1936

4 Claims. (Cl. 88—14)

This invention relates to apparatus for comparing or measuring the diffuse reflection of light from surfaces. By comparing the diffuse reflection of light from two surfaces of similar colour an indication of the relative diffusion from the surfaces may be obtained or by the use of suitable colour filters the colours of two samples may be compared.

In carrying out my invention I provide means for directing light normally or substantially normally onto the surface of a sample, photoelectric means adapted to be affected substantially only by light reflected diffusely from the surface and a measuring device operatively associated with the photoelectric means.

Preferably means are associated with the measuring instrument whereby the zero point and/or the sensitivity may be adjusted.

Generally the photoelectric means will be disposed in a photometric integrating container such as a sphere or cubical box with whitened inner surfaces. Conveniently the box is provided with means for trapping light specularly reflected from the sample.

Preferably the photoelectric means is of the rectifier type. For example, selenium or copper oxide cells may be used.

By the present invention I provide a means for comparing the colours of different surfaces relatively to one another by passing light through suitable colour filters onto the said surfaces and obtaining for each surface and each colour filter an indication of the light diffusely reflected.

One arrangement in accordance with the invention will now be described by way of example with reference to the accompanying diagrammatic drawing which shows a part-sectional elevation of a cubical photometric integrating container.

In the drawing, the body of the apparatus comprises a closed box I which contains a plurality of photoelectric elements 2, two of which are shown, suitably disposed within the box I. A substantially parallel beam of light is directed into one side of the box, across the box and through a hole 10 on the opposite side of the box from a metal filament electric lamp 3, an image of the filament being focussed by a condensing lens 4 on a small aperture in a diaphragm 5 placed at the focal point of a projecting lens 6. The light after passing through the projecting lens 6 traverses an internally blackened sleeve 7 within the box I, which sleeve 7 is adapted to trap light specularly reflected from the surface of the sample under test.

During operation, if a sample 8 having a substantially flat surface is by means of a holder 9 placed against the hole 10 on the said opposite side of the box, some of the incident light is reflected back into the box I, the specularly reflected light being returned along the path of the incident beams and trapped in the sleeve 7, the scattered light, however, being reflected to the whitened walls of the box.

The diffusely reflected light affects the photoelectric elements 2 and the current produced by the elements is measured by a current meter 12 connected therewith, the reading of the current meter 12 being substantially proportional to the diffusely reflected light. The photoelectric means 2 are of the rectifier type.

A holder 13 for a colour filter 14 is provided in the path of the incident light and by interposing various colour filters in the path of the incident light, the reflecting properties of samples can be investigated in lights of different colours and hence, for example, the colours of different samples can be matched.

Thus blue, green and red filters may be used and in operation when each filter has been placed in position in the holder 13 adjacent to the projecting lens 6, a white surface is placed in the holder 9 for the samples and an adjustment is made to bring the reading of the meter 12 to the full scale deflection. The samples are then placed one by one in the holder 9 and the respective deflections of the meter noted. From the readings a deficiency or excess in a sample of any colour may be observed.

Provided that the readings of the meter for the different colours bear the same ratios for the various samples the colours are correctly matched. The readings need not be identical since the proportion of specular and diffuse reflection will not be the same for each sample.

An auxiliary photoelectric cell 15 is arranged to be influenced by a variable beam of light derived from the main beam of light and adapted to vary the zero point of the measuring instrument. Thus the output from the auxiliary cell 15 acts in opposition to the output of the main photoelectric cells and a pivoted piece of glass 16 disposed in the path of the main light beam may be turned by an external handle to vary the amount of reflected light incident on the auxiliary cell 15, the latter being housed in an additional compartment 17. It will be noticed that with this arrangement if for any reason the brightness of the filament of the lamp 3 varies the opposing current of the auxiliary cell 15 as well as the operating current from the main cells 2 will vary together in the same sense.

Preferably means are also provided for adjusting the sensitivity of the measuring instrument 12. This enables relatively accurate readings to be taken when samples differing but little from one another are to be compared.

For example, suppose the diffuse reflection from samples A and B is to be compared and under normal operating conditions sample B gives a reading of 98 divisions and sample A a slightly greater reading, the scale of the current meter being divided into a hundred equal parts. Then conveniently, with sample B in position the zero point of the meter is varied until zero reading is obtained. This result is suitably achieved by the use of the auxiliary cell 15 described above and by increasing the light incident therein, although any suitable variable source of current could be used.

A white sample is then placed in position and the sensitivity of the current meter is adjusted until it reads 100, this result being suitably obtained by the use of a variable shunt of any well known type.

Finally sample A is placed in position and tested. For the same change in current the pointer movement will now be fifty times as great as before.

I claim:

1. An apparatus for comparing surfaces by diffuse light comprising an integrating chamber having a hole in one wall at which the surfaces to be compared are placed for illumination, a lens tube in the wall of the chamber opposite said hole provided with lenses for projecting a beam of parallel rays of light perpendicularly onto said surface to be illuminated, a plurality of current generating photoelectric elements mounted within said chamber in spaced relation to each other circumferentially of the axis of said beam of light, said photoelectric elements being uniformly spaced from said hole and adapted to be activated by diffuse light coming in direct line from the illuminated surface, a current measuring instrument, means connecting said plurality of photoelectric elements in parallel circuit for utilizing the current generated by activation thereof for operating said measuring instrument, a light transmitting and reflecting member comprising a plate of glass in the path of said beam of parallel rays, means for mounting said plate of glass transversely within said lens tube for angular adjustment relative to the axis thereof for reflecting a portion of said beam of parallel rays at an angle thereto, a closed compartment extending at right angles to said lens tube into which said portion of the beam of light is reflected when the plate of glass is angularly positioned, a photoelectric element in said compartment arranged to be activated by the portion of light reflected by said plate of glass and circuit connections from the photoelectric element in said compartment to said measuring instrument for supplying current thereto in opposition to the current from said plurality of photoelectric elements.

2. An apparatus for comparing surfaces by diffuse light as in claim 1 wherein the lens tube beyond said adjustable reflector plate of glass and adjacent the wall of the integrating chamber is arranged to receive color filter plates transversely of the tube through which that portion of the beam of parallel rays not reflected by the plate of glass is adapted to pass before it enters said integrating chamber.

3. An apparatus for comparing surfaces by diffuse light as in claim 1 wherein the lens tube beyond said reflector plate of glass and within the integrating chamber is provided with a tubular extension, the interior of which tubular extension is coated dead black to trap light specularly reflected from said surface when the latter is illuminated.

4. In an apparatus for comparing surfaces by diffuse light comprising an integrating chamber having a hole in one wall at which the surfaces to be compared are placed for illumination, a lens tube in the wall of the chamber opposite said hole provided with lenses for projecting a beam of parallel rays of light perpendicularly onto the surface to be illuminated, a plurality of current generating photoelectric elements mounted within said chamber in spaced relation to each other circumferentially of the axis of said beam of light, said photoelectric elements being uniformly spaced from said hole and adapted to be activated by diffuse light coming in direct line from the illuminated surface, a current measuring instrument and means connecting said plurality of photoelectric elements in parallel circuit therewith for utilizing the current generated by activation of the elements for operating said measuring instrument, means for adjustably varying the reading of said measuring instrument comprising an auxiliary current generating photoelectric element having circuit connections in the measuring instrument for delivering thereto a current in opposition to the current from said plurality of photoelectric elements and a plate which in part transmits and in part reflects light falling thereon pivotally mounted on a transverse axis within said lens tube by means of which one portion of the light is so reflected as to fall upon the auxiliary photoelectric element and another portion is transmitted through said plate, the amount of light reaching the said auxiliary photoelectric element being controlled by rotation of said plate.

WILLIAM ARTHUR JOHNSON.